United States Patent
Takanashi et al.

[11] Patent Number: 5,255,351
[45] Date of Patent: Oct. 19, 1993

[54] PULSE-WIDTH MODULATION DEVICE

[75] Inventors: Itsuo Takanashi, Kamakura; Takashi Yamamura; Toshikatsu Ichitou, both of Yokohama; Kazunori Namiki, Yokosuka, all of Japan

[73] Assignee: Victor Company of Japan, Ltd., Yokohama, Japan

[21] Appl. No.: 835,898

[22] Filed: Feb. 14, 1992

[30] Foreign Application Priority Data

Feb. 15, 1991 [JP] Japan ................... 3-042778

[51] Int. Cl.$^5$ ............................................. G06K 15/00
[52] U.S. Cl. ....................................... 395/109; 395/107
[58] Field of Search ............... 395/101, 109, 107, 104; 358/296, 298, 455, 456, 457, 459; 346/154, 157

[56] References Cited

U.S. PATENT DOCUMENTS

| | | |
|---|---|---|
| 4,347,523 | 8/1982 | Ohara . |
| 4,467,367 | 8/1984 | Ohara et al. ................. 358/298 |
| 4,985,779 | 1/1991 | Gall ........................... 358/298 |

FOREIGN PATENT DOCUMENTS

| | | | |
|---|---|---|---|
| 0234809 | 9/1987 | European Pat. Off. ............ | 395/109 |
| 3408187 | 9/1984 | Fed. Rep. of Germany ...... | 395/109 |
| 62-236204 | 10/1987 | Japan ................... | 395/109 |
| 2196498 | 4/1988 | United Kingdom ............. | 395/109 |

*Primary Examiner*—Arthur G. Evans
*Attorney, Agent, or Firm*—Lowe, Price, LeBlanc & Becker

[57] ABSTRACT

A pulse-width modulation device for controlling shapes of dots printed out by a printer by regulating shapes of pulses of pulse-width modulation signals, which respectively represent gray levels of pixels of input image, according to code signals respectively indicating shapes of pulses of pulse-width modulation signals, each of which has a duration composed of time slots respectively corresponding to bits of image data representing a gray level of a pixel. The pulse-width modulation device is provided with a code converter for converting image data corresponding to each pixel of an input image into a predetermined code indicating a shape of a pulse of a corresponding pulse-width modulation signal and for outputting a code signal representing the predetermined code. The indicated shape of the pulse is formed by making the corresponding pulse modulation signal have a high level at a predetermined number of time slots thereof, which are serially counted from the time slot corresponding to the most significant bit of the image data or from the time slot corresponding to the least significant bit of the image data according to a gray level of each pixel. The pulse-width modulation device is further provided with a pulse generating circuit for receiving the code signal and for generating the pulse of the predetermined pulse-width modulation signal according to the code in response to a predetermined clock signal.

3 Claims, 6 Drawing Sheets

FREQ : FREQUENCY
DEMUL : DEMULTIPLIER

FIG. 1

FREQ : FREQUENCY
DEMUL : DEMULTIPLIER

| IMAGE DATA D | OUTPUT CODE SIGNAL C |
|---|---|
| 0  | 0 0 0 0 0 0 0 0 |
| 1  | 1 0 0 0 0 0 0 0 |
| 2  | 1 1 0 0 0 0 0 0 |
| 3  | 1 1 1 0 0 0 0 0 |
| 4  | 1 1 1 1 0 0 0 0 |
| 5  | 1 1 1 1 1 0 0 0 |
| 6  | 1 1 1 1 1 1 0 0 |
| 7  | 1 1 1 1 1 1 1 0 |
| 8  | 1 1 1 1 1 1 1 1 |
| 9  | 0 0 0 0 0 0 0 1 |
| 10 | 0 0 0 0 0 0 1 1 |
| 11 | 0 0 0 0 0 1 1 1 |
| 12 | 0 0 0 0 1 1 1 1 |
| 13 | 0 0 0 1 1 1 1 1 |
| 14 | 0 0 1 1 1 1 1 1 |
| 15 | 0 1 1 1 1 1 1 1 |

| 1 | 2 | 3 |
|---|---|---|
| 4 | 5 | 6 |
| 7 | 8 | 9 |

FIG. 6(a)

| 0 | 0 | 0 |
|---|---|---|
| 12 | 8 | 0 |
| 0 | 0 | 0 |

| 0 | 0 | 0 |
|---|---|---|
| 0 | 8 | 4 |
| 0 | 0 | 0 |

PRIOR ART

PULSE-WIDTH MODULATION DEVICE

BACKGROUND OF THE INVENTION

1. Field of the Invention

This invention generally relates to a pulse-width modulation device and more particularly to a pulse-width modulation device for controlling laser beams emitted by a laser provided in a laser-beam printer.

2. Description of the Prior Art

There has been developed a practical laser-beam printer by combining a laser with an electrophotographic system. In case of such a laser-beam printer, for the purpose of printing a halftone image, a pulse-width modulation of a laser-light modulation signal is performed to control a printing time required for printing data corresponding to each pixel.

Figure 8:
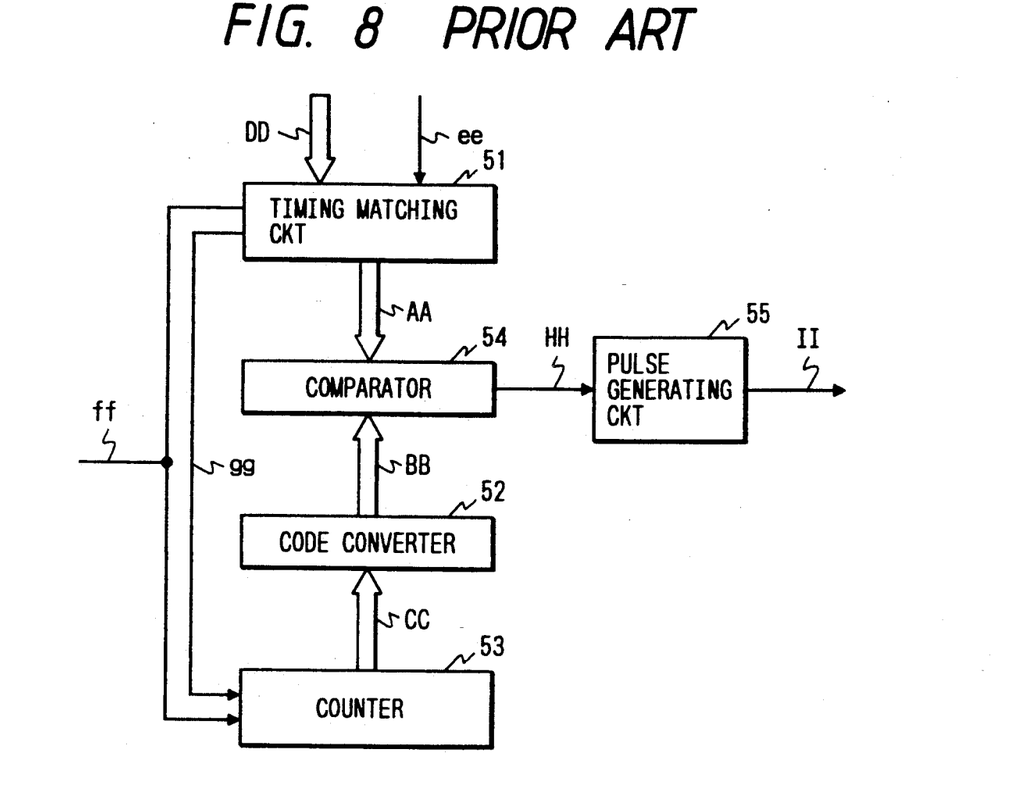
FIG. 8 is a schematic block diagram for illustrating the configuration of a conventional pulse-width modulation device.
Figure 9:
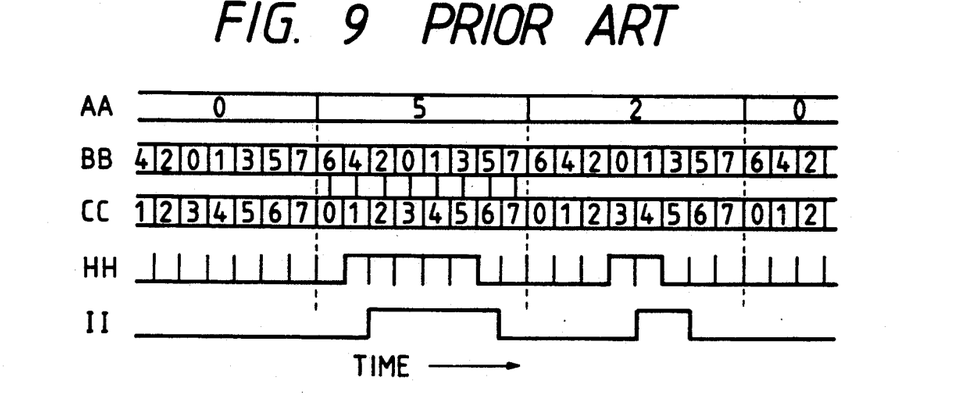
FIG. 9 is a timing chart for illustrating an operation of the device of FIG. 8.

FIG. 8 is a schematic block diagram for illustrating the configuration of a conventional pulse-width modulation device. FIG. 9 is a timing chart for illustrating an operation of the device of FIG. 8.

Hereinafter, the configuration and operation of the device of FIG. 8 will be described by referring to FIGS. 8 and 9. In FIG. 8, reference character ff represents reference clock signal; and 51 a timing matching circuit. When, for example, a signal representing 3-bit input data DD is input to the timing matching circuit 51 in synchronization with an input clock signal ee, the timing matching circuit 51 converts the input data DD into predetermined type data AA and then outputs the data AA to a comparator 54. Reference numeral 52 denotes a code converter which converts a value CC counted by a counter 53 into data represented by a signal BB and subsequently outputs the signal BB to the comparator 54. Further, reference character gg designates a clearing signal. The value CC held in the counter 53 is cleared in synchronization with a leading edge of the clearing signal gg. Further, the comparator 54 first compares the data AA with the value (hereunder referred to simply as the data BB) indicated by the signal BB. Subsequently, the comparator 54 outputs a result-of-comparison signal HH, which represents a result of the comparison and has a high voltage level in case where the data AA is greater than the data BB, to a device (not shown) for performing what is called a glitch deleting processing. After such a processing is performed on the result-of-comparison signal HH, the signal HH is input to a pulse generating circuit 55 which then outputs a pulse signal II as illustrated in FIG. 9.

Figure 10:
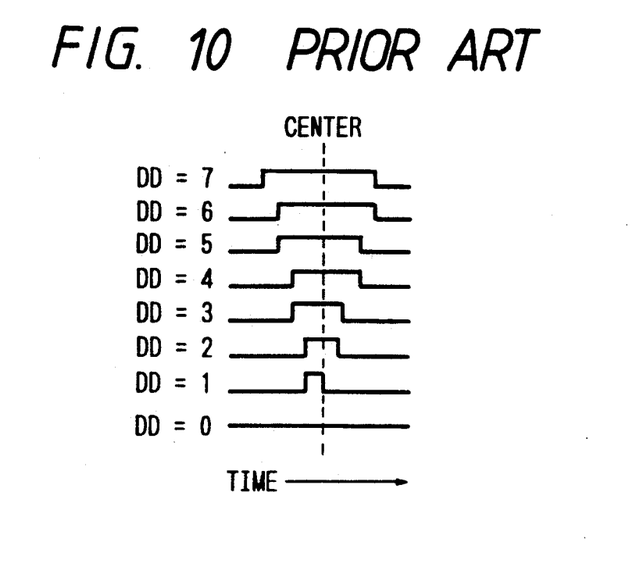
FIG. 10 is a diagram for illustrating a pulse-width modulation operation performed on the pulse signal II output from the pulse generating circuit of the conventional pulse-width modulation device of FIG. 8.

FIG. 10 is a diagram for illustrating a pulse-width modulation operation performed on the pulse signal II output from the pulse generating circuit 55 of FIG. 8.

As is seen from FIGS. 9 and 10, the position of a dot is put in the vicinity of a center of a corresponding one of the pulses II in case of the conventional pulse-width modulation device of FIG. 8.

Hereinafter, problems, which occur in case where an image is output from a laser-beam printer employing the conventional pulse-width modulation device of FIG. 8, will be described by referring to FIG. 11.

FIG. 11 is a diagram for illustrating an example of a dot output or printed by the laser-beam printer by employing the device of FIG. 8 in case of using a 3×3 threshold-value matrix as mapped input image data.

Figures 11A, 11D:
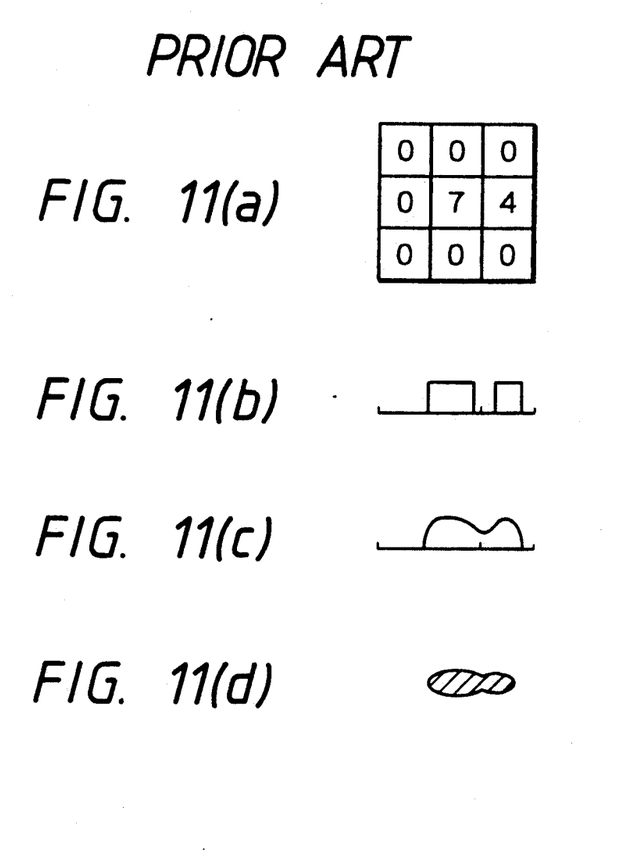

FIG. 11(a) shows the contents of the 3×3 threshold-value matrix. As shown in this figure, there are what is called a micro-pixel (hereunder referred to simply as a pixel) having a gray level (or tone level) of 7 and an adjoining pixel having a tone level of 4 in the matrix. FIG. 11(b) shows a pulse-width modulation signal produced in this case. As shown in this figure, there are two discontinuous pulses. Further, FIG. 11(c) shows a corresponding energy distribution in this case. Moreover, FIG. 11(d) shows a dot reproduced by the laser-beam printer as a result of using the device of FIG. 8. As is seen from FIG. 11(d), there is only a small joint between dots respectively corresponding to the pixels, the gray levels of which are 7 and 4, respectively. Namely, connection between the dots respectively corresponding to these adjoining pixels is bad. Note that this is due to discontinuity of the pulse-width modulation signal (namely, due to the presence of the discontinuous pulses) as illustrated in FIG. 11(b). Further, in some cases, there is no joint between dots respectively corresponding to two adjacent pixels. Namely, in some cases, dots respectively corresponding to two adjacent pixels are discontinuous. Thus the spatial frequency of a dot pattern becomes high. Consequently, the conventional pulse-width modulation device has a drawback in that no "stable" halftone image can be output. Moreover, the conventional pulse-width modulation device has other drawbacks in that the circuit configuration thereof is complex and in that the cost thereof is high. The present invention is accomplished to eliminate the drawbacks of the conventional pulse-width modulation device.

It is, accordingly, an object of the present invention to provide a pulse-width modulation device which has a simple circuit configuration and can obtain a "stable" halftone image (namely, a halftone image of good picture-quality and high reproducibility) by preventing an occurrence of discontinuous pulses of a pulse-width modulation signal.

SUMMARY OF THE INVENTION

To achieve the foregoing object and in accordance with an aspect of the present invention, there is provided a pulse-width modulation device for controlling shapes of dots printed out by a printer by regulating shapes of a pulse of a pulse-width modulation signal according to a code signal representing a code which indicates a shape of a pulse of a pulse-width modulation signal. This device comprises a code conversion means for converting image data corresponding to each micro-pixel into a predetermined code signal indicating a shape of a pulse and a pulse generating means for receiving the code signal and generating a predetermined pulse-width modulation signal according to a predetermined clock signal.

Further, in accordance with another aspect of the present invention, there is provided a pulse-width modulation device for controlling shapes of dots printed out by a printer by regulating shapes of pulses of pulse-width modulation signals, which respectively represent gray levels of micro-pixels of input image, according to code signals respectively indicating shapes of pulses of pulse-width modulation signals, each of which has a duration composed of time slots respectively corresponding to bits of image data representing a gray level of a micro-pixel. This pulse-width modulation device comprises a code conversion means for converting image data corresponding to each micro-pixel of an input image into a code indicating a shape of a pulse of a corresponding pulse-width modulation signal, the code being predetermined according to a relative position of a micro-pixel in a corresponding set of micropixels, and for outputting a code signal representing the predetermined code. The indicated shape of the pulse is formed by making the corresponding pulse modulation signal have a high level at a predetermined corresponding number of time slots thereof, which time slots are serially connected from the time slot corresponding to the most significant bit of the image data or from the time slot corresponding to the least significant bit of the image data according to a gray level of each pixel. This pulse-width modulation device further comprises a pulse generating means for receiving the code signal and for generating the pulse of the predetermined pulse-width modulation signal according to the code in response to a predetermined clock signal, thereby preventing an occurrence of discontinuous pulses corresponding to a dot.

The above described configurations of the pulse-width modulation devices of the present invention are simple. Therefore, the cost can substantially be reduced.

Further, even in case of adjacent dots, the pulse-width modulation devices of the present invention can prevent an occurrence of discontinuous pulses corresponding to the dots. Consequently, a "stable" halftone image can be obtained as a result of printing by a printer.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIGS. 3(a)-(c) are diagrams for illustrating a method of converting image data represented by an image data signal D (hereunder sometimes referred to simply as image data D) into a predetermined code signal C, which is employed for performing an operation of the pulse-width modulation device of FIG. 1;

FIGS. 11(a)-(d) are diagrams for illustrating an example of a dot printed by the laser-beam printer by employing the device of FIG. 8 in case of using a 3×3 threshold-value matrix as input image data.

DETAILED DESCRIPTION OF THE PREFERRED EMBODIMENT

Hereinafter, a preferred embodiment of the present invention will be described in detail by referring to the accompanying drawings.

Figure 1:
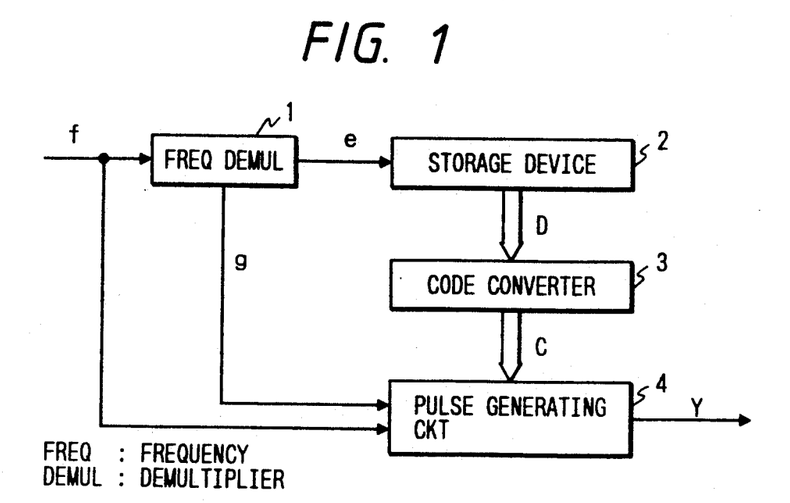
FIG. 1 is a schematic block diagram for illustrating the configuration of a pulse-width modulation device embodying the present invention.

FIG. 1 is a schematic block diagram for illustrating the configuration of a pulse-width modulation device embodying the present invention. In this figure, reference numeral 1 designates a frequency demultiplier or divider for performing a frequency demultiplication of a clock f and outputting a dot clock signal e, the frequency of which is (1/n) times that of the clock signal f, as the result of the frequency demultiplication. Incidentally, "n" is a predetermined positive integer. Here, note that a gray level N of each pixel can be equal to (n+1). Reference numeral 2 denotes a storage device for outputting a signal, which represents image data D, in synchronization with the dot clock signal e. A random access memory (RAM), a read-only memory (ROM) or any other kind of a magnetic memory may be employed as the storage device 2. Further, reference numeral 3 designates a code converter for converting the image data D into data represented by a predetermined code signal C. Moreover, reference numeral 4 denotes a pulse generating circuit for loading the data represented by the code signal C in response to a shift register loading signal g and for generating a pulse modulation signal Y according to the clock signal f.

In this embodiment, output data D is composed of three bits D0 to D2 and thus can indicate eight kinds of pulse-width modulation patterns. Generally, a code converter may be formed by a ROM, a RAM, a combinatorial circuit (namely, a combinational circuit) or the like. In this embodiment, the code converter 3 is formed by a ROM. The 3-bit image data D are input to the code converter 3 as data indicating addresses assigned to locations within the ROM. Thereafter, the code converter 3 outputs an 8-bit code signal C representing an 8-bit code composed of eight bits C0 to C7.

Next, practical structures of primary portions of the pulse-width modulation device of FIG. 1 will be described hereinbelow.

Figure 2A:
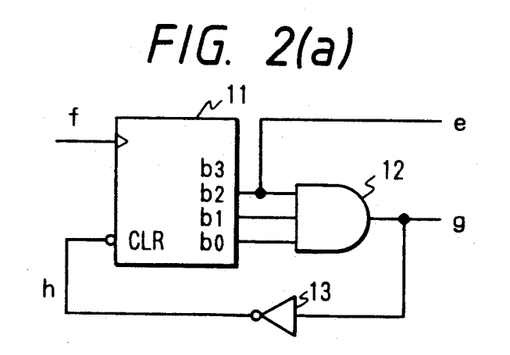
FIGS. 2(a)-(c) are diagrams for illustrating practical structures of primary portions of the pulse-width modulation device of FIG. 1.
Figure 2B:
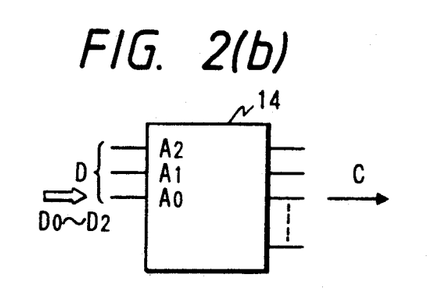
Figure 2C:
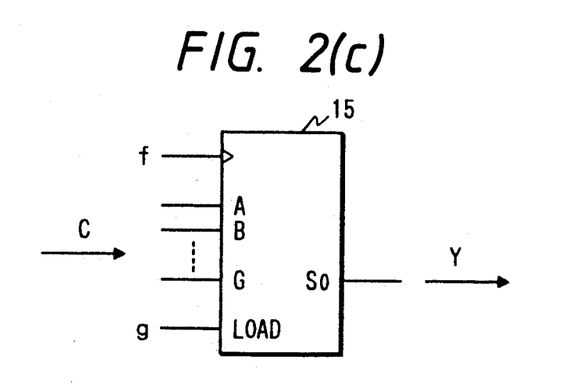

FIG. 2 is a diagram for illustrating the practical structures of the primary portions of the pulse-width modulation device of FIG. 1.

FIG. 2(a) shows a practical structure of the frequency demultiplier. In this figure, reference numeral 11 designates a binary counter; 12 and AND circuit; and 13 an inverter circuit. The frequency demultiplier 1 counts the input clock signals f. Further, when counting seven input clock signals f, the frequency demultiplier 1 outputs a counter clearing signal h, a shift-register loading signal g and a dot clock signal e.

FIG. 2(b) shows a practical structure of the code converter 3. Reference numeral 14 denotes the ROM. As described above, the image data D composed of bits D0 to D2 are input to the code converter 3 as data indicating addresses assigned to locations within the ROM. Thereafter, the code converter 3 outputs the code signal C representing a code composed of eight bits C0 to C7, which corresponds to the image data.

FIG. 2(c) shows a practical structure of the pulse generating circuit 4. Reference numeral 15 denotes a shift register, to which the code represented by the code signal C is loaded in response to the shift-register loading signal g. The shift register 15 serially outputs the code bit by bit in response to the clock signals f.

Next, it will be described hereinbelow how the problem of an occurrence of discontinuous pulses of the conventional pulse-width modulation device can be resolved by using the device of FIG. 1. Here, a case of serially counting the number of time slots, at which the pulse modulation signal has a high level, from the time slot corresponding to the most significant bit of image data, as well as a case of serially counting the number of time slots from the time slot corresponding to the least significant bit of the image data, is considered.

Figure 3A:
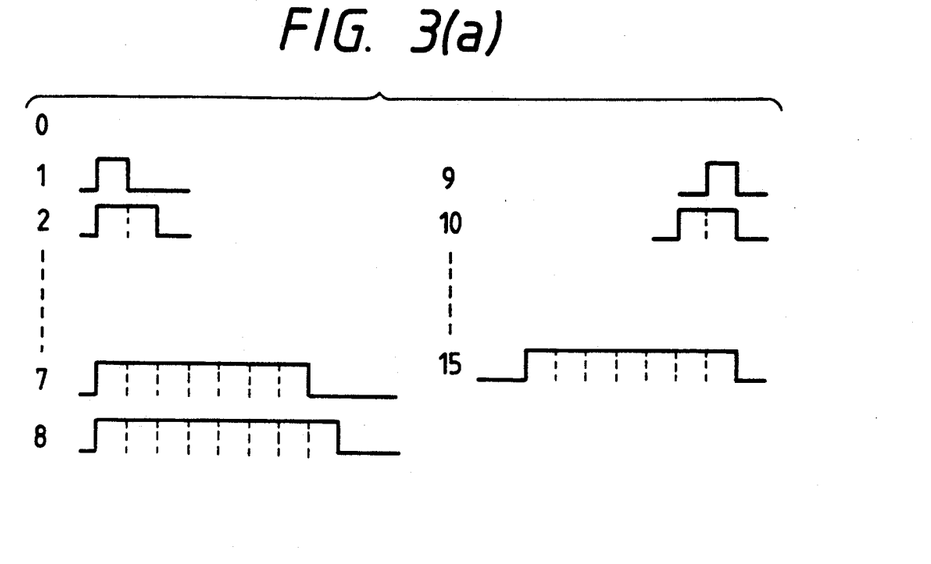
Figure 3B:
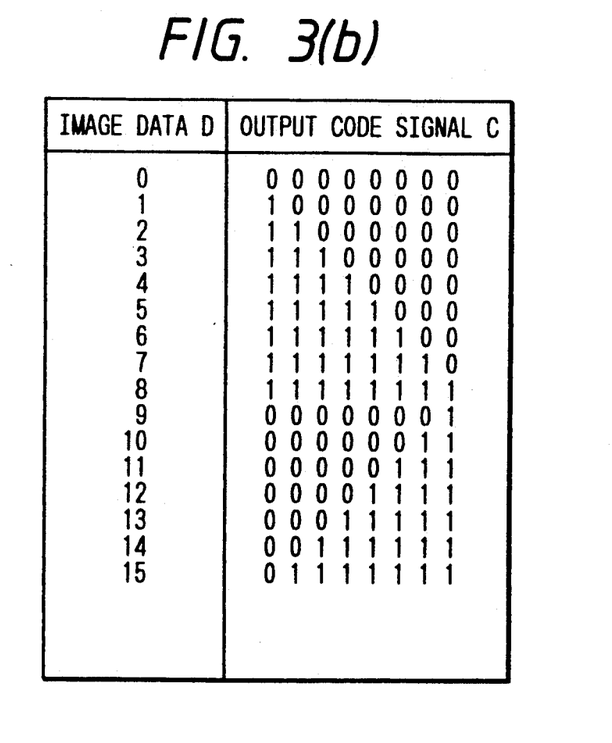

FIG. 3 is a diagram for illustrating a method of converting the image data D into the predetermined code signal C, which is employed for performing an operation of the pulse-width modulation device of FIG. 1. FIG. 3(a) shows pulse-width modulation patterns employed in cases of producing pulses by making the pulse modulation signal have a high level at a predetermined number of time slots thereof, which are serially counted from the time slot corresponding to the most significant bit of image data or from the time slot corresponding to the least significant bit of the image data. FIG. 3(b) is a diagram for illustrating code conversions in cases of employing the pulse-width modulation patterns of FIG. 3(a).

As shown in FIG. 3(a), for example, in case where the image data D indicates one of gray levels of from 1 to 7, a pulse is generated by making the pulse modulation signal have a high level at a corresponding number of time slots thereof, which are serially counted from the time slot corresponding to the most significant bit of the image data. Further, in case where the image data D indicates one of gray levels of from 9 to 15, a pulse is generated by making the pulse modulation signal have a high level at a corresponding number of time slots thereof, which are serially counted from the time slot corresponding to the least significant bit of the image data. Moreover, in case where the gray level indicated by the image data D is 0, there is not output pulse. Furthermore, in case where the gray level indicated by the image data D is 8, an output pulse has a full width or duration of the pulse-width modulation signal. Note that there are seven couples of gray levels (namely, (1, 9), (2, 10), . . . and (7, 15)), the corresponding pulses of each couple of which have the same width (thus the corresponding dots have the same density) but are different from each other in that one is put to the right and the other is put to the left in the duration of the pulse-width modulation signal as viewed in FIG. 3(a). Thus dots printed by a printer can have nine density levels respectively corresponding to the seven couples and gray levels of 0 and 8 in all.

Incidentally, the input image data D represent 16 patterns or gray levels and thus should be 4 bits or more in length. Thus, as stated above, the 4-bit input image data is input to the ROM 14 of FIG. 2(b) as data indicating addresses therein.

As is understood from the foregoing description, the relation between the input image data d and the codes represented by the output code signal C may be established as illustrated in FIG. 3(b) in order to output or print dots by employing the pulse-width modulation patterns of FIG. 3(a).

Such pulse-width modulation patterns cannot be formed by the conventional method or device. This is because the code represented by the code signal C as illustrated in FIG. 3(b) (namely, a code from which a pulse is formed by making the pulse modulation signal have a high level at time slots of the number, which is indicated by the code and are serially counted from the time slot corresponding to the most or least significant bit of the image data) cannot be generated by the code converter of the conventional device which serially converts values obtained by sequentially counting clock signals by the counter thereof into a code in a predetermined manner, as is apparent from the descriptions of the prior art and FIGS. 8 and 9.

Next, a pulse modulation operation of this embodiment will be described hereinbelow by referring to a timing chart.

Figure 4:
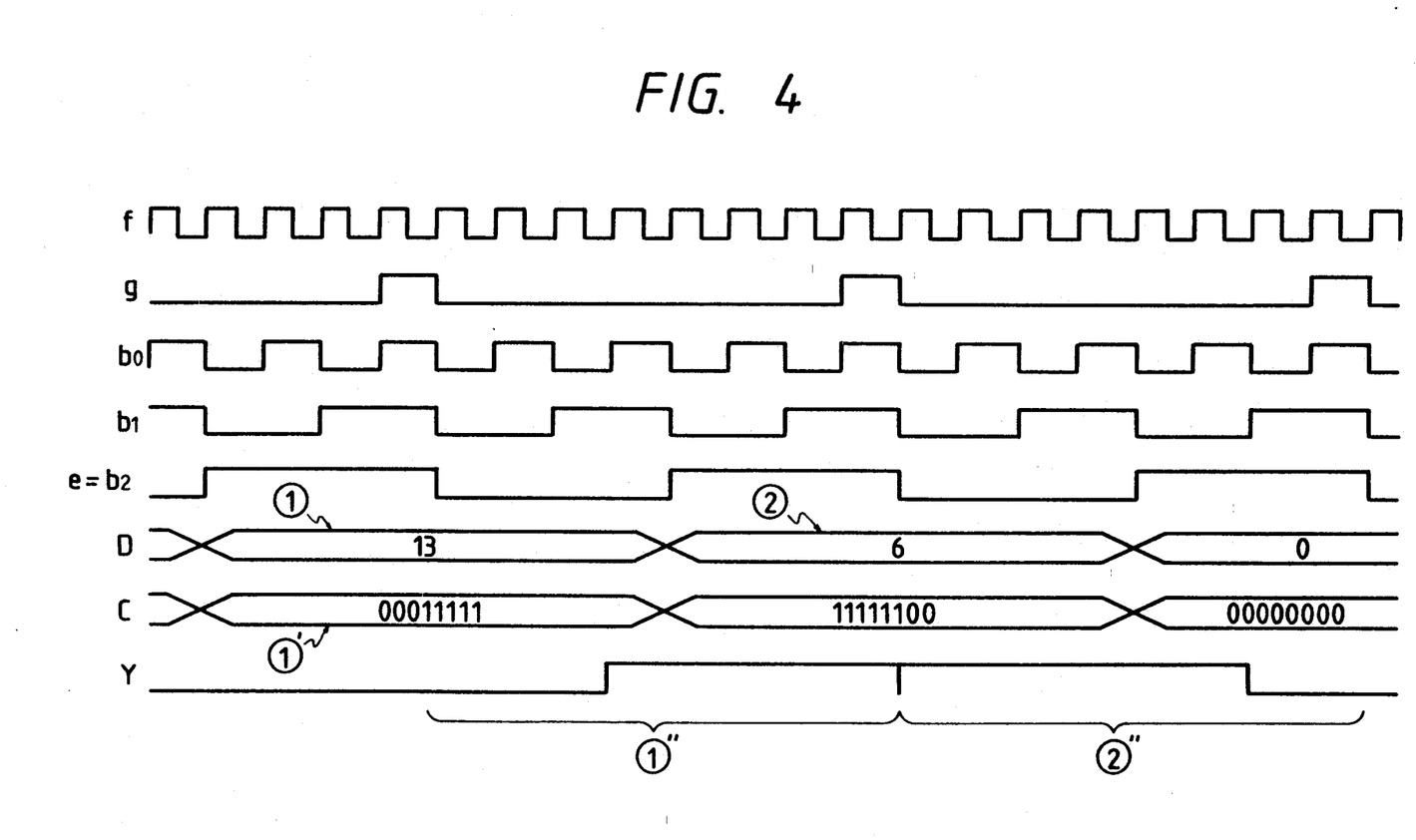
FIG. 4 is a timing chart for illustrating an operation of the pulse-width modulation device of FIG. 1.

FIG. 4 is a timing chart for illustrating a pulse modulation operation of the pulse-width modulation device of FIG. 1. In this figure, like reference characters designate like or corresponding parts of FIGS. 1 and 2. FIGS. 1 to 3 are also referred to in the following description of a pulse modulation operation of this embodiment.

First, a frequency demultiplication of the clock signal f is performed by the frequency demultiplier 1. Further, the dot clock signal e and the shift register loading signal g are produced at moments as illustrated in FIG. 4. Then, the image data D is output from the storage device 2 in response to the dot clock signal e. A value of image data indicated by a portion ①of an image data signal D is 13. This image data D is input to the code converter 3 and subsequently is converted according to a conversion rule (namely, a conversion table) of FIG. 3(b) therein into a code represented by a portion ①' of the code signal C (hereunder sometimes referred to simply as a code C). This code C is loaded into the shift register 15 of FIG. 2(c) in response to the shift register loading signal g. Further, the output signal Y is output from the pulse generating circuit in response to the clock signal f. Incidentally, a portion ①" of the output signal Y of FIG. 4 corresponds to the portion ① of the image data signal D.

Additionally, this is the same with a portion ② of the image data signal D, as is illustrated in FIG. 4.

Next, examples of outputs of a laser-beam printer using the pulse-width modulation patterns will be described hereinbelow.

Figure 5:
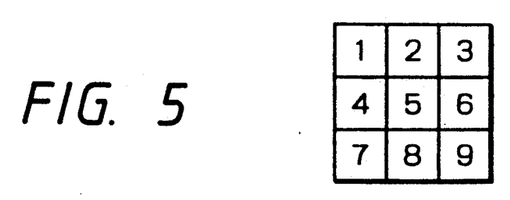
FIG. 5 is a diagram for illustrating numbers of pixels of a 3×3 threshold-value matrix employed as image data to be used in an operation of the pulse-width modulation device of FIG. 1.

FIG. 5 is a diagram for illustrating numbers of elements of a 3×3 threshold-value matrix employed as image data to be used in an operation of the pulse-width modulation device of FIG. 1. Here, an appropriate assignment of pulse-width modulation patterns, which respectively correspond to codes of FIG. 3(b) represented by the code signal C, to pixels of the matrix of FIG. 5 is searched for with the aim of preventing an occurrence of discontinuous pulses. An example of such an appropriate assignment is as follows. Namely, the pulse-width modulation patterns corresponding to gray levels of from 9 to 15, which are used to make the pulse-width modulation signal have a high level at time slots serially counted from the time slot corresponding to the least significant bit of image data, are applied to the pixels of the numbers 1, 4 and 7 of FIG. 5. Further, the pulse-width modulation patterns corresponding to gray levels of from 1 to 7, which are used to make the pulse-width modulation signal have a high level at time slots sequentially counted from the time slot corresponding to the most significant bit of image data, are applied to the pixels of the numbers 3, 6 and 9 of FIG. 5.

Figure 6A:
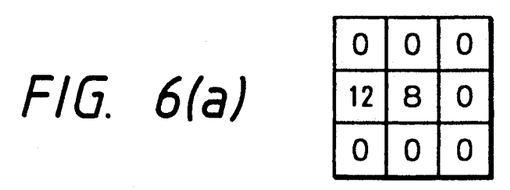
FIGS. 6(a)-(c) are diagrams for showing an example of a result of printing the image data represented by the 3×3 threshold-value matrix by a laser-beam printer which employs the pulse-width modulation device of FIG. 1.
Figure 6B:
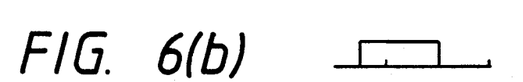
Figure 6C:
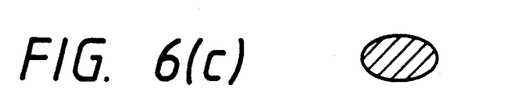

FIG. 6 is a diagram for showing an example of a result of printing the image data represented by the 3×3 threshold-value matrix by a laser-beam printer which employs the pulse-width modulation device of FIG. 1.

FIG. 6(a) shows values of gray levels at the pixels of the matrix of FIG. 5. FIG. 6(b) shows a pulse-width modulation pattern (namely, the waveform of a pulse of the pulse-width modulation signal) corresponding to the matrix of FIG. 6(a) employed as image data. FIG. 6(c) shows the shape of a dot reproduced or printed according to the pulse-width modulation pattern of FIG. 6(b).

Figure 7A:
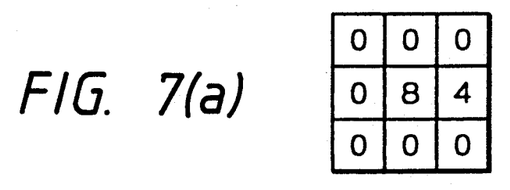
FIGS. 7(a)-(c) are diagrams for showing another example of the result of printing the image data represented by the 3×3 threshold-value matrix by the laser-beam printer which employs the pulse-width modulation device of FIG. 1.
Figure 7B:
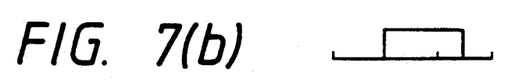
Figure 7C:
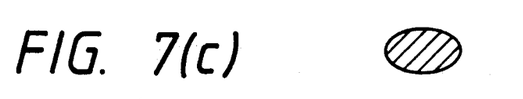

FIG. 7 is a diagram for showing another example of the result of printing the image data represented by the 3×3 threshold-value matrix by the laser-beam printer which employs the pulse-width modulation device of FIG. 1. In case where the gray level of the pixel of the number 5 is 8 and that of the next pixel on the left side thereof is 4, a pulse-width modulation pattern becomes as illustrated in FIG. 7(b). Further, a dot reproduced according to the pulse-width modulation pattern of FIG. 7(b) becomes continuous as illustrated in FIG. 7(c).

As described with reference to FIGS. 6 and 7, a continuous pulse of the pulse-width modulation signal can be obtained even in case of employing the matrix of FIG. 11(a) as image data, from which discontinuous pulses occur in the conventional device of FIG. 8. Additionally, in this case, the pulse width of the pulse of FIG. 6(b) is equal to that of the pulse of FIG. 7(b). Therefore, the density of the reproduced dot of FIG. 6(c) is equal to that of the reproduced dot of FIG. 7(c).

In case of the embodiment of the present invention, a pulse of a pulse-width modulation signal corresponding to each pixel is continuous with a pulse of a pulse-width modulation signal corresponding to a pixel adjacent thereto. Especially, when performing a method such as what is called a "dot concentration method" in which a dot density is represented by using a set of micro-pixels, a "stable" halftone image can be reproduced.

Incidentally, the aforementioned pulse-width modulation device of the present invention can obtain the effects when performing the control method described by referring to FIGS. 3 to 7. Apparently, other control methods such as the conventional method described by referring to FIGS. 10 and 11 may be employed in the pulse-width modulation device of the present invention.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A pulse-width modulation device for controlling shapes of dots printed out by a printer by regulating shapes of pulses of pulse-width modulation signals, which respectively represent gray levels of micro-pixels of input image, according to code signals respectively indicating shapes of pulses of pulse-width modulation signals, each of which has a duration composed of time slots respectively indicating shapes of pulses of pulse-width modulation signals, each of which has a duration composed of time slots respectively corresponding to bits of image data representing a gray level of a micro-pixel, each dot being formed by printing a corresponding set of micro-pixels, the pulse-width modulation device comprising:

a code conversion means for converting image data corresponding to each micro-pixel of an input image into a code indicating a shape of a pulse of a corresponding pulse-width modulation signal, the code being predetermined according to a relative position of a micro-pixel in a corresponding set of micro-pixels, and for outputting a code signal representing the predetermined code, the indicated shape of the pulse being formed by making the corresponding pulse modulation signal have a high level at a predetermined corresponding number of time slots thereof, which time slots are serially connected from the time slot corresponding to the most significant bit of the image data or from the time slot corresponding to the least significant bit of the image data according to a gray level of each pixel; and a pulse generating means for receiving the code signal and for generating the pulse of the predetermined pulse-width modulation signal according to the code in response to a predetermined clock signal, thereby preventing an occurrence of discontinuous pulses corresponding to a dot.

2. The pulse-width modulation device as set forth in claim 1, which further comprises:

a frequency demultiplication means for performing a frequency demultiplication of the clock signal and for outputting a dot clock signal, the frequency of which is a first integral submultiple (1/n) of the frequency of the clock signal, and a shift register loading signal, the frequency of which is a second integral submultiple of the frequency of the clock signal, a density of each dot being represented by one of (n+1) levels; and a storage means for storing the image data, for receiving the dot clock signal and for outputting a signal representing the image data in synchronization with the dot clock signal, wherein the pulse generating means receives the shift register load signal and the code is loaded into the pulse generating means in response to the shift register load signal.

3. The pulse-width modulation device as set forth in claim 1, wherein the code conversion means is a read-only memory and stores the codes at predetermined addresses therein, wherein the image data corresponding to each micro-pixel represents the address, at which corresponding one of the codes is stored, of the read-only memory and wherein a code signal indicating the corresponding code is output from the address represented by the image data to the pulse generating means.

* * * * *